(12) United States Patent
Covington et al.

(10) Patent No.: US 7,937,426 B2
(45) Date of Patent: May 3, 2011

(54) INTERVAL GENERATION FOR NUMERIC DATA

(75) Inventors: Clinton D. Covington, Redmond, WA (US); Timothy E. Getsch, Redmond, WA (US)

(73) Assignee: Mircosoft Corporation, Redmond, WA (US)

( * ) Notice: Subject to any disclaimer, the term of this patent is extended or adjusted under 35 U.S.C. 154(b) by 1180 days.

(21) Appl. No.: 11/479,590

(22) Filed: Jun. 30, 2006

(65) Prior Publication Data

US 2008/0005210 A1    Jan. 3, 2008

(51) Int. Cl.
G06F 7/00 (2006.01)

(52) U.S. Cl. .................................... 708/200
(58) Field of Classification Search .............. 708/200
See application file for complete search history.

(56) References Cited

U.S. PATENT DOCUMENTS

| | | | |
|---|---|---|---|
| 5,701,453 A | 12/1997 | Maloney et al. | |
| 5,787,411 A | 7/1998 | Groff et al. | |
| 5,963,938 A | 10/1999 | Wilson et al. | |
| 6,122,627 A | 9/2000 | Carey et al. | |
| 6,134,564 A * | 10/2000 | Listou | 715/236 |
| 6,279,016 B1 | 8/2001 | De Vorchik et al. | |
| 6,304,670 B1 | 10/2001 | Berestov | |
| 6,473,751 B1 | 10/2002 | Nikolovska et al. | |
| 6,484,164 B1 | 11/2002 | Nikolovska et al. | |
| 6,499,029 B1 | 12/2002 | Kurapati et al. | |
| 6,505,194 B1 | 1/2003 | Nikolovska et al. | |
| 6,662,177 B1 | 12/2003 | Martino et al. | |
| 6,667,743 B2 * | 12/2003 | Bertram et al. | 345/440 |
| 6,785,668 B1 | 8/2004 | Pole et al. | |
| 6,980,875 B1 | 12/2005 | Stromberg | |
| 7,162,471 B1 | 1/2007 | Knight et al. | |
| 7,519,585 B2 | 4/2009 | Kenney et al. | |
| 2001/0007988 A1 | 7/2001 | Bauchot et al. | |
| 2002/0055981 A1 | 5/2002 | Sparey | |
| 2003/0065650 A1 | 4/2003 | Annand et al. | |
| 2003/0188259 A1 | 10/2003 | Aureglia et al. | |
| 2004/0111666 A1 | 6/2004 | Hollcraft | |
| 2004/0143788 A1 | 7/2004 | Aureglia et al. | |
| 2004/0190793 A1 * | 9/2004 | Rorvig et al. | 382/305 |
| 2004/0254916 A1 | 12/2004 | Dettinger et al. | |
| 2005/0149482 A1 | 7/2005 | Dillon | |
| 2005/0165841 A1 | 7/2005 | Kasperkiewicz et al. | |

(Continued)

FOREIGN PATENT DOCUMENTS

CA    2398103    2/2004

(Continued)

OTHER PUBLICATIONS

EP Notice of Office Action, Application No. EP 05 105 142.3, mailed Oct. 22, 2008; 4 pages.

(Continued)

*Primary Examiner* — Tan V Mai
(74) *Attorney, Agent, or Firm* — Merchant & Gould, P.C.

(57) ABSTRACT

Embodiments of the present invention relate to the generation of intervals from a selection of numeric data. An interval is a set of numeric data that is organized between two numeric values that may include one or both of those numeric values. In an embodiment, a data program 100 receives 502 a selection of data 118. A number of intervals 132 are generated 506 for the selected data set 118. The selected data 118 is organized into the several intervals 132. The intervals 132 are then provided 508 to the user.

20 Claims, 9 Drawing Sheets

U.S. PATENT DOCUMENTS

| | | | |
|---|---|---|---|
| 2005/0187904 | A1 | 8/2005 | Nose et al. |
| 2005/0240984 | A1 | 10/2005 | Farr et al. |
| 2005/0267853 | A1 | 12/2005 | Netz et al. |
| 2005/0267910 | A1 | 12/2005 | Anson |
| 2006/0074879 | A1 | 4/2006 | Covington |
| 2007/0208709 | A1 | 9/2007 | Annand et al. |

FOREIGN PATENT DOCUMENTS

| | | |
|---|---|---|
| GB | 2329492 | 3/1999 |

OTHER PUBLICATIONS

European Search Report, Application EP 05 105 142.3-1225, mailed Dec. 6, 2006; 3 pages.
USPTO Non-Final Office Action, U.S. Appl. No. 11/316,090, mailed Mar. 23, 2007; 13 pages.
Amendment and Response to Non-Final Office Action dated Mar. 23, 2007, U.S. Appl. 11/316,090, filed Jun. 22, 2007, 11 pages.
USPTO Notice of Non-Compliant Amendment, U.S. Appl. No. 11/316,090, mailed Jun. 27, 2007, 2 pages.
Amendment and Response to Notice of Non-Complaint Amendment dated Jun. 27, 2007, U.S. Appl. No. 11/316,090, filed Jul. 27, 2007.
USPTO Final Office Action, U.S. Appl. No. 11/316,090, mailed Oct. 17, 2007, 17 pages.
Amendment and Response to Final Office Action mailed Oct. 17, 2007, U.S. Appl. No. 11/316,090, filed Jan. 16, 2008, 10 pages.
USPTO Non-Final Office Action, U.S. Appl. No. 11/316,090, mailed Apr. 30, 2008, 18 pages.
Amendment and Response to Non-Final Office mailed Apr. 30, 2008, U.S. Appl. No. 11/316,090, filed Jul. 30, 2008, 16 pages.
USPTO Final Office Action, U.S. Appl. No. 11/316,090, mailed Sep. 18, 2008, 11 pages.
Amendment and Response to Final Office Action mailed Sep. 18, 2008, U.S. Appl. No. 11/316,090, filed Nov. 18, 2008, 7 pages.
USPTO Notice of Allowance and Fees Due, U.S. Appl. No. 11/316,090, mailed Jan. 27, 2009, 12 pages.
Preliminary Amendment, U.S. Appl. No. 10/956,866, filed Jan. 24, 2006, 5 pages.
USPTO Non-Final Office Action, U.S. Appl. No. 10/956,866, mailed Mar. 23, 2007, 13 pages.
Amendment and Response to Non-Final Office Action mailed Mar. 23, 2007, U.S. Appl. No. 10/956,866, filed Jun. 27, 2007, 13 pages.
USPTO Final Office Action, U.S. Appl. No. 10/956,866, mailed Jul. 23, 2007, 16 pages.
USPTO Notice of Abandonment, U.S. Appl. No. 10/956,866, mailed Mar. 7, 2008, 2 pages.
Data Entry Validation, Chapter 37, pp. 749-772, available at http://www.jalix.org/resources/internet/javascript/_jsbible/ch37.pdf (24 pages).
k:info: An Architecture for Smart Billboards for Informal Public Spaces, available at http://people.csail.mit.edu/emax/papers/vankleek-kinfo-2003.pdf (2 pages).
Excel 2000 Intermediate, Sep. 21, 2000, available at http://www.uic.edu/depts/accc/seminars/excel2000-intermed/databases-advanced.html (2 pages).
Spotlight® for WebLogic Server, Mar. 22, 2005, available at http://java.quest.com/dist/downloads/spotlightWLS112/sowl_getting_started.pdf (60 pages).

\* cited by examiner

INTERVAL GENERATION FOR NUMERIC DATA

BACKGROUND

Data programs are used to record data or information. Generally, data programs include, but are not limited to, spreadsheets and databases. Data programs generally store data in data records. Many data records, in the data programs, consist of numeric values. These numeric values often have an extensive range and are very difficult for a user to understand or organize conceptually. To organize numeric data, users must either employ complicated, user-generated macros, rely on a series of simple filters, or manually manipulate the numeric data into an understandable form. Large numeric data sets are thus difficult to organize and, generally, data programs do little to help.

SUMMARY

Embodiments of the present invention generally relate to the sorting of numeric data records or numeric data for presentation to a user and further to the generation of intervals for numeric data.

Embodiments of the invention relate to systems and methods for the generation of intervals from a selection of numeric data. In one embodiment, a data program receives a selection of data. An interval generation component determines a number of intervals for the selected data and organizes the selected data into several intervals. The data program then provides the intervals to the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

This disclosure will now more fully describe some embodiments with reference to the accompanying drawings, in which only some of the possible embodiments are shown. Other aspects may, however, be embodied in many different forms and should not be construed as limited to the embodiments set forth herein. Rather, these embodiments are provided so that this disclosure will be thorough and complete and will fully convey the scope of the possible embodiments to those skilled in the art.

Figure 1:
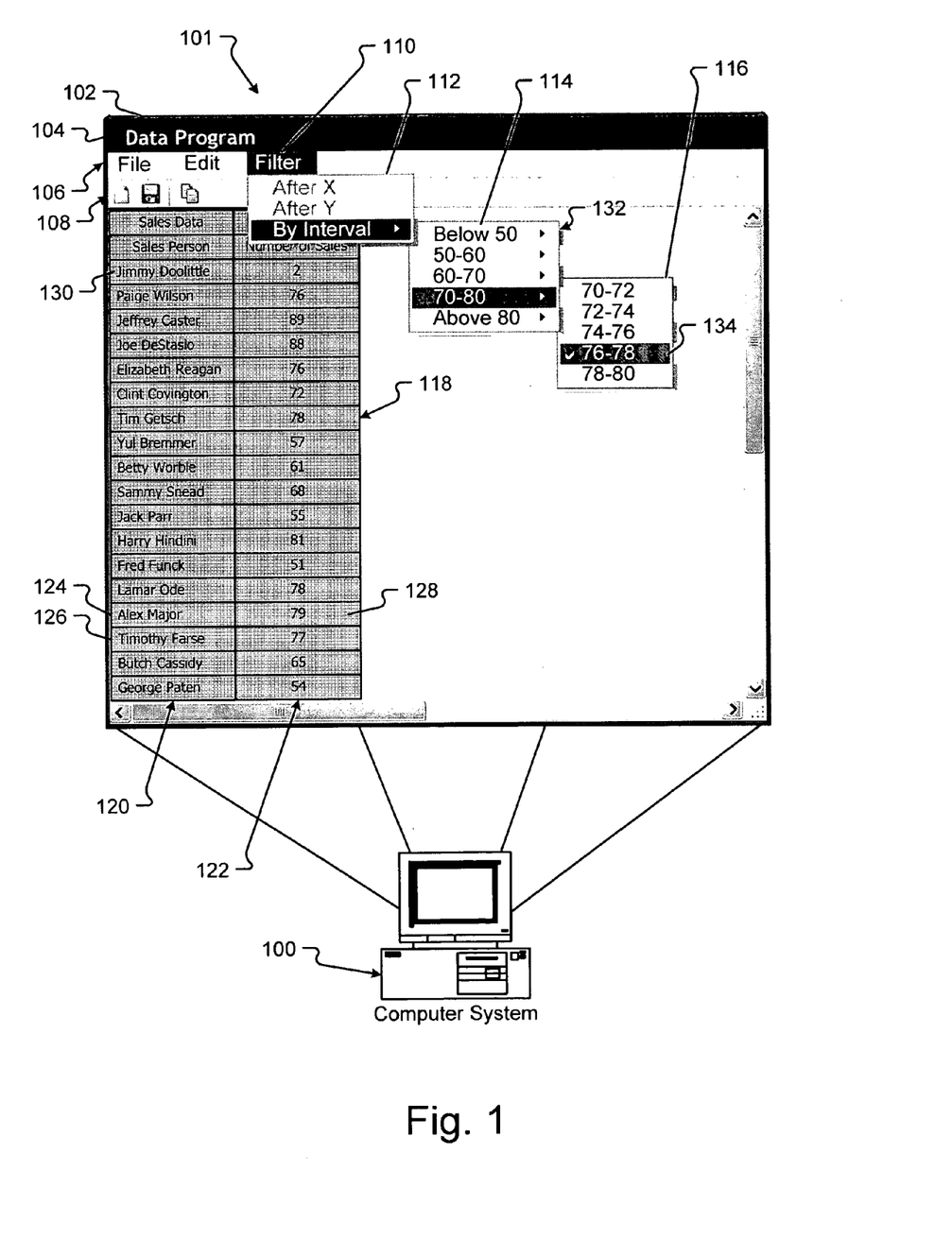
FIG. 1 is an embodiment of a display of a data program providing intervals in a menu.

An embodiment of a computer system 100 displaying a data program 101 that provides a user with interval selections is shown in FIG. 1. In embodiments, an interval is a single numeric value or a set of numeric data that is organized between two numeric values that, in some embodiments, includes one or both of those numeric values. An interval, in other embodiments, is organized as an open-ended range, for example, "above 100." In embodiments, the intervals are numeric data that represent subsets of a larger data set.

A set of data 118 is selected, as represented by the highlighted data. A user then selects, with a user interface device, a component that generates intervals for the selected data. In the embodiment, the user selected a filter menu selection 110 and a "By Interval" filter option. The data program 101 automatically generated a set of intervals, as shown in fly-out menu 114, for the associated data 118. The user further selected an interval that produced a sub-interval menu 116.

The data program 101 provides a window 102 that includes one or more title bars, such as title bar 104, one or more menu bars, such as menu bar 106, one or more button bars, such as button bar 108, and data, such as data 118. The data program 101 can be any program that displays, manipulates or organizes data. Embodiments of data programs include, but are not limited to, spreadsheets, such as "MICROSOFT®" Excel Spreadsheet Program, or databases, such as "MICROSOFT®" Access Database Program. In one embodiment, the data is organized into columns, such as columns 120 and 122, and rows, such as rows 124 and 126. The intersection of columns and rows create cells, such as cell 128. The entire set of data forms a worksheet, and one or more worksheets forms a workbook. Other methods of organizing the data are possible and within the spirit and scope of the attached claims.

While the interval selections are shown in a filter menu 114, the intervals are, in other embodiments, displayed in other user interface elements. For example, the intervals are automatically generated upon a selection of a data and displayed in a main menu, such as the filter menu 110. In other embodiments, the intervals are displayed in a pop-up window generated when a user completes a sequence of user inputs, such as right-clicking a selection of data. Still further embodiments include data statistics displays that show the intervals but do not provide the intervals as selections for a task, such as filtering.

The intervals are associated with a selection of data. Thus, if the data changes within the selection, the intervals provided will change. For example, if the entry for "Jimmy Doolittle" 130 is deleted from the data selection 118, the interval option "Below 50" 132 is not provided because there would be no data in an interval starting at 1 (one) and ending at 50. The number of intervals provided is a function of the amount of data entries selected and the range of the numeric data. However, in embodiments, a user is provided with 6 to 14 entries because that number of entries is easier for users to understand. How the number and range of the intervals is selected is described more fully with reference to FIGS. 5-7.

Figure 2:
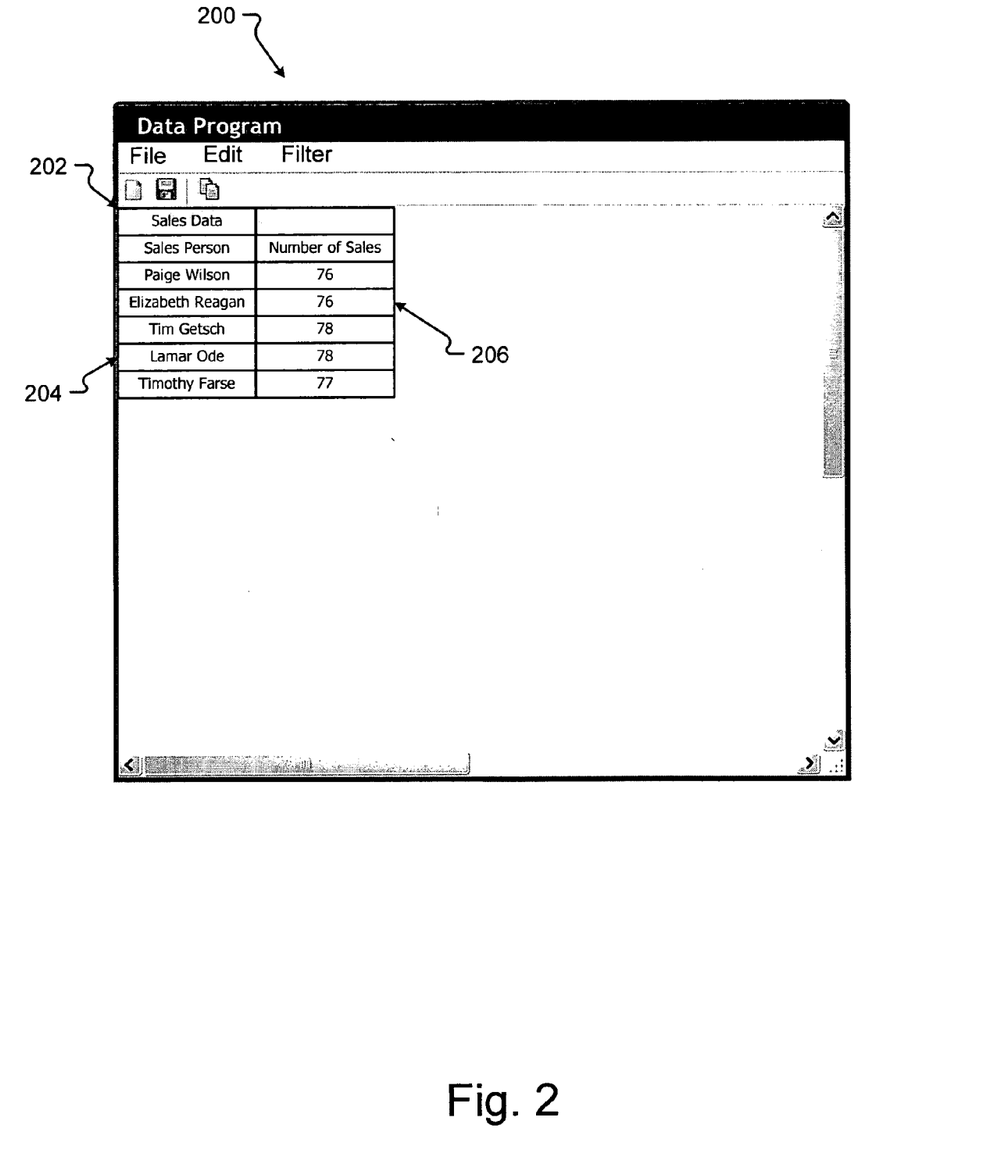
FIG. 2 is an embodiment of a display of a data program providing the results after a user chooses a filter menu selection that filters by an interval.

A further embodiment of a data program 200 is shown in FIG. 2. In the embodiment, the user has selected the interval filter selection 134 (FIG. 1), and the data program 200 has returned a result set of data 202. The result set of data 202 includes fewer data entries 204, and only those data entries 204 whose column 2 data values 206 are within the selected interval, i.e., 76-78, are displayed. The embodiment shows how an interval is used to filter data within a data program.

Figure 3:
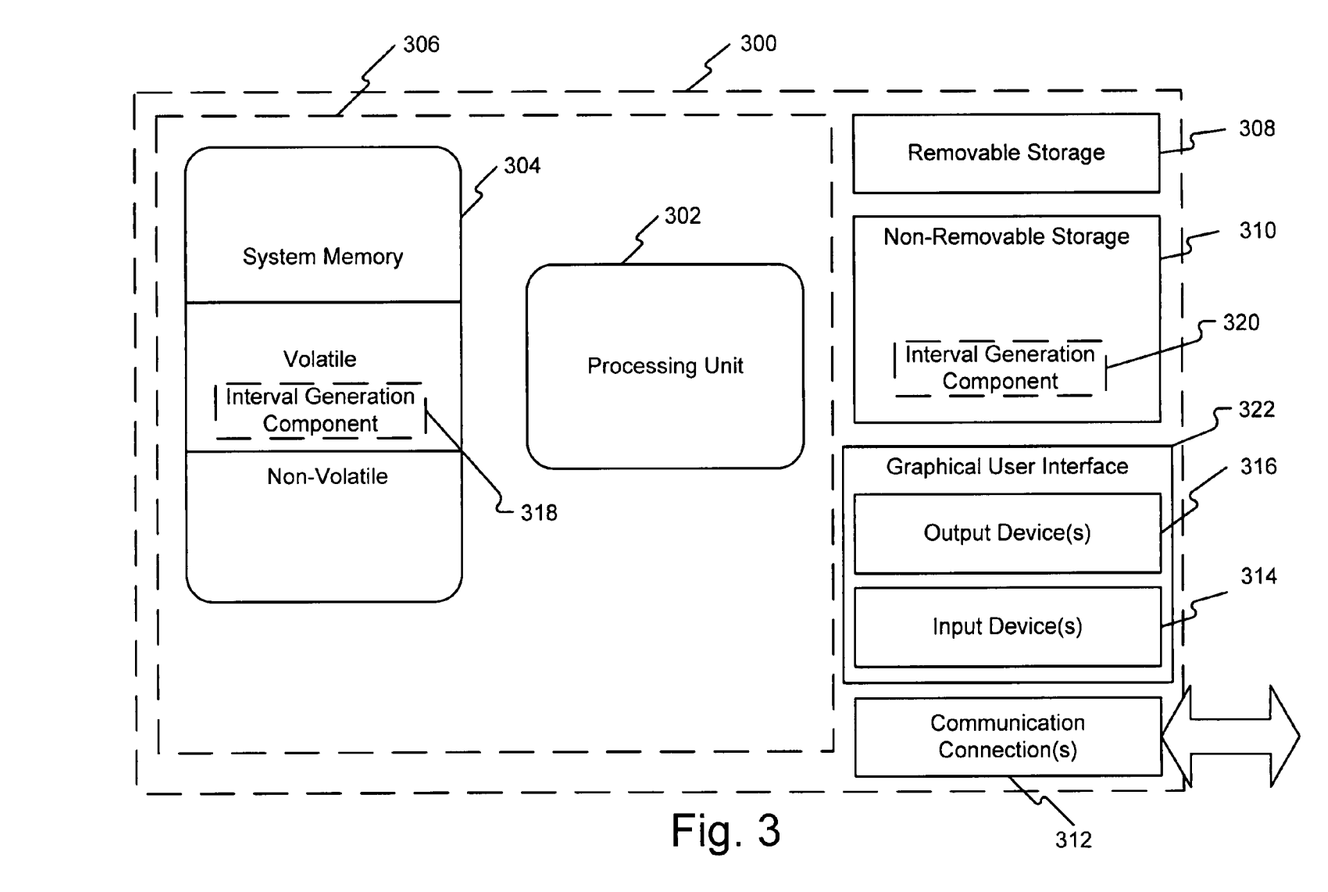
FIG. 3 is a functional diagram illustrating a computer environment and computer system operable to provide intervals.

With reference to FIG. 3, an embodiment of a computing environment for implementing the embodiments described herein includes a computer system, such as computer system 300. The generation of intervals may be done on a client computer system, on a server computer system, on a combination of client and server computer systems, on a handheld device, and in other possible computing environments. As such, a basic computer system applicable to all these environments is described hereinafter.

In its most basic configuration, computer system 300 typically includes at least one processing unit 302 and system memory 304. In embodiments, an interval generation component 318 is loaded into and run by the processing unit 302 from system memory 304. Depending on the exact configuration and type of computer system 300, memory 304 may be volatile (such as RAM), non-volatile (such as ROM, flash memory, etc.), or some combination of the two. This most basic configuration of the computer system 300 is illustrated in FIG. 3 by dashed line 306.

Additionally, device 300 may also have additional features/functionality. For example, device 300 includes additional storage (removable and/or non-removable) including, but not limited to, magnetic or optical disks or tape. Such additional storage is illustrated in FIG. 3 by removable storage 308 and non-removable storage 310. In embodiments, an interval generation component 320 is permanently stored in non-removable storage 310, although interval generation component 320 may be saved into removable storage 308, and loaded into system memory 304 for execution by the processing unit 302. In some embodiments, the interval generation component 320 is one or several components of a data program. Computer storage media includes volatile and nonvolatile, removable and non-removable media implemented in any method or technology for storage of information such as computer readable instructions, data structures, program modules, or other data.

Memory 304, removable storage 308, and non-removable storage 310 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which is used to store the desired information, such as interval generation component, and which is accessed by device 300 and processor 302. Any such computer storage media may be part of device 300.

Device 300 may also contain communications connection(s) 312 that allow the device to communicate with other devices. In embodiments, the communication connections 312 are used to generate intervals with an interval generation component 318 executed on a server (not shown) that is accessed over a network, such as the Internet, that receives selected data, and that sends intervals back to a client after interval generation. In still other embodiments, an interval generation component 318 is loaded into system memory 304 or stored into removable storage 308 or non-removable storage 310 from a server accessed using the communication connections 312.

Communications connection(s) 312 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

In embodiments, device 300 includes a graphical user interface 322 that includes input devices 314 and output devices 316. Data selections for an interval generation component 318, in embodiments, are selected with user input device(s) 314, and the intervals are displayed with output device(s) 316. Input device(s) 314 are also referred to as user interface selection devices and include, but are not limited to, a keyboard, a mouse, a pen, a voice input device, a touch input device, etc. Output device(s) 316 are also referred to as displays and include, but are not limited to, cathode ray tube displays, plasma screen displays, liquid crystal screen displays, speakers, printers, etc. These devices, either individually or in combination, form the graphical user interface 322 used to display the intervals as described herein. All these devices are well know in the art and need not be discussed at length here.

Computer system 300 typically includes at least some form of computer readable media, which is some form of computer readable medium. Computer readable media can be any available media that can be accessed by processing unit 302. By way of example, and not limitation, computer readable media comprise computer storage media and communication media. Interval generation component 318 comprises such modules or instructions executable by computer system 300 that may be stored on computer storage medium and other tangible mediums and transmitted in communication media. Computer storage media includes volatile and nonvolatile, removable and non-removable media implemented in any method or technology for storage of information such as computer readable instructions, data structures, program modules, or other data. Combinations of the any of the above should also be included within the scope of computer readable media.

In some embodiments, computer system 300 is part of a network that stores data in remote storage media for use by the computing system 300. In embodiments, an interval generation component 318 executing on a client system may access the remotely stored data to generate intervals for the remotely stored data. In other embodiments, the computing system 300 is a desktop or similar computer that stores and operates the interval generation component 318 on local client data stored in a local storage medium. In still other embodiments, the interval generation component 318 is executed remotely on a server computer system, wherein intervals are returned to a client computer system but not generated on the client computer system. Yet another embodiment includes one or more handheld devices that accesses data and executes the interval generation component on the accessed data. For example, a user may wish to have intervals generated on the handheld inventory computer. The interval generation component executes to provide the user with intervals for bar codes or inventory numbers that allow the user to easily select a set of products for inventory control.

Figure 4:
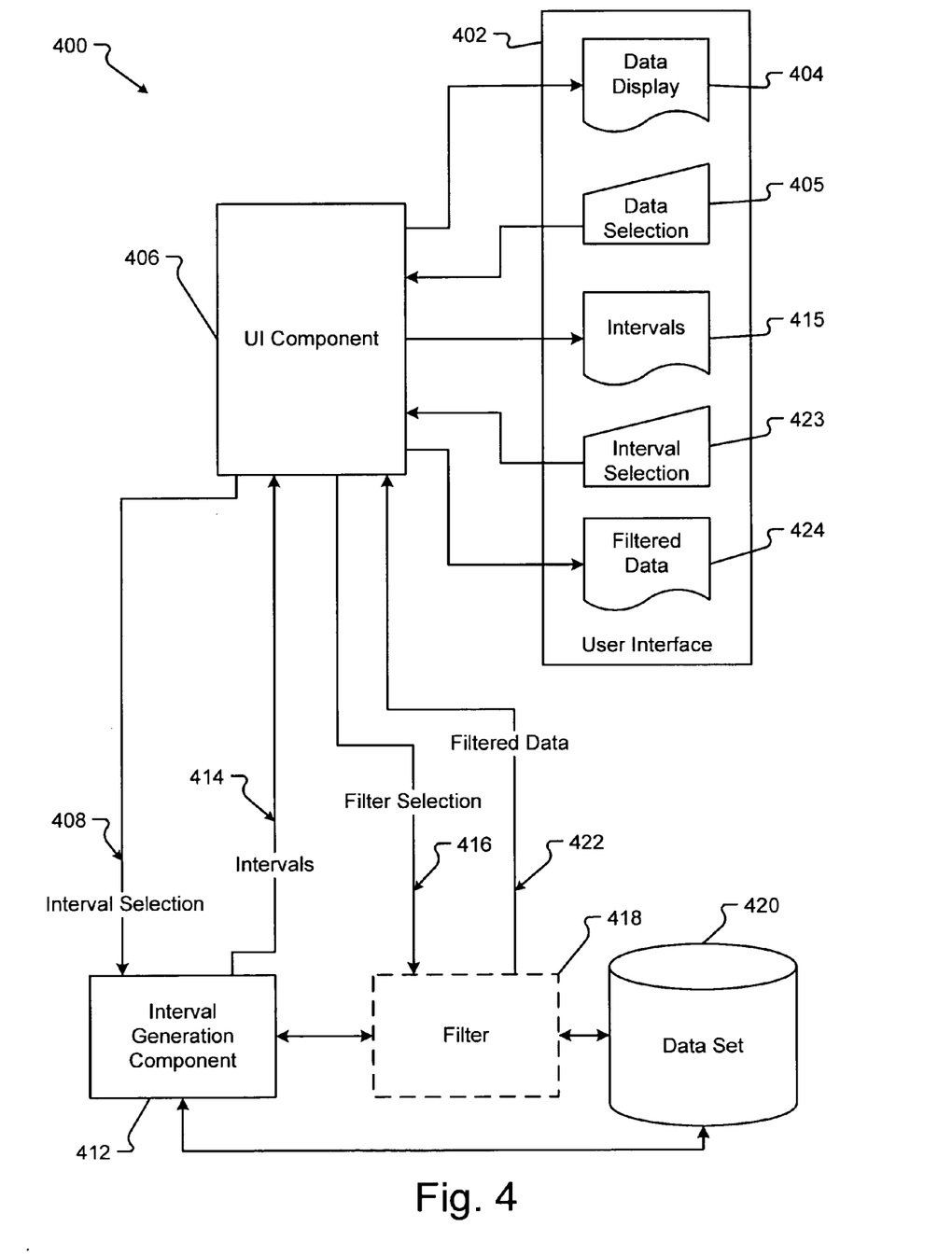
FIG. 4 is a block diagram of an embodiment of a data program including an interval generation component.

An embodiment of a component of a data program 400 is shown in FIG. 4. The embodiment shown in FIG. 4 relates to the generation of intervals in the data program 400. For example, the intervals are generated for filtering a selection of data by an interval. However, the intervals may be generated using similar components but for different applications. The data program 400 comprises a user interface (UI) component 406 that generates displays for and receives selections from a user interface 402, an interval generation component 412 that generates intervals and a data set 420. In further embodiments, the data program 400 includes an optional filter 418.

The user interface 402 provides information to the user or receives input from the user. For example, the user interface 402 is a window display, such as window 101 (FIG. 1). The UI component 406 is the code responsible for generating outputs to or interpreting inputs from the user interface 402. The interval generation component 412 is the code that determines the number, separations between and the types of intervals for the selected data in a data set 420. The data set 420 is a collection of data, such as data 118 (FIG. 1). In some embodiments, the data set 420 is a subset of a larger portion of data or, in other embodiments, is an entire set of data. The data set 420 may be used by a spreadsheet or database program, but other data programs may use a data set and provide intervals for those data sets. The optional filter 418 generates one or more types of filters that are sent to the UI component 406 for presentation on the user interface 402.

In one embodiment, a user is provided with a data display 404. For example, the data display appears as data display 118 (FIG. 1). A user then provides a data selection 405. In an embodiment, the user selects, such as by highlighting with a mouse or other user input device 314 (FIG. 3), a portion of data within the data program. For example, the data selection 118 (FIG. 1) is highlighted in the data program 101 (FIG. 1). The user then provides a request 423 for intervals, such as by selecting a filter menu or some other action. In one embodiment, by highlighting a selection of data, the data program automatically recognizes a request 423 for intervals.

User interface (UI) component 406 processes the data selection 405 and the interval request 423. In one embodiment, the UI component 406 sends an interval selection request 408 to the interval generation component 412. The interval generation component 412 determines a number of intervals and the ranges for the intervals. This process is explained in more detail with reference to FIGS. 5, 6 and 7. The interval generation component 412 sends intervals 414, such as an interval menu, back to the UI component 406 for display on the user interface 402. The displayed intervals 415, in one embodiment, appear as a menu of interval selections, such as interval menu 114 (FIG. 1). The user then makes another interval selection 423 for an interval by which to filter, or perform some other operation to, the selection of data 405.

Optionally, the UI component 406 receives the interval filter selection 423, such as interval filter selection 134 (FIG. 1). The filter selection 416 is sent to a filter 418. The filter 418 applies the selected interval filter to at least a portion of the data set 420. The filtered data 422 is then sent to the UI component 406 for presentation to the user interface 402. The user interface 402 displays the filter data 424, such as filtered data 206 (FIG. 2).

Figure 5:
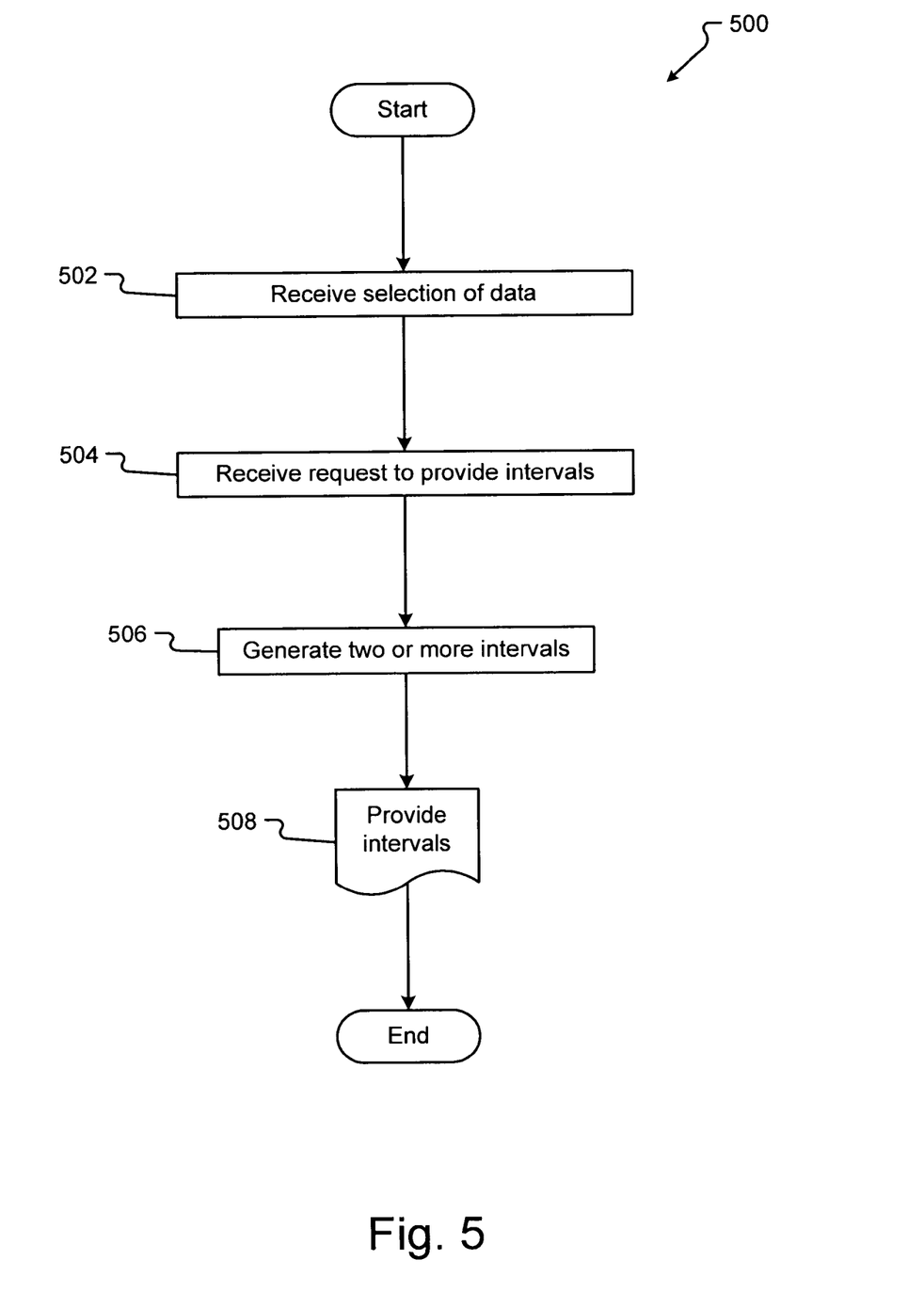
FIG. 5 is a flow diagram representing an embodiment of a method for generating intervals.

A method 500 for providing intervals is shown in FIG. 5. In the embodiment, method 500 is executed in a computer system, such as computer system 300 (FIG. 3), as a computer readable medium, such as computer readable medium 318 (FIG. 3), which includes computer implemented steps or instructions. Receive operation 502 receives a selection of data, such as data selection 405 (FIG. 4). In one embodiment, a user selects a portion of data, such a data selection 118 (FIG. 1), with a user input device, such as user input device 314 (FIG. 3), in a user interface, such as user interface 402 (FIG. 4). Receive operation 504 receives a request to provide intervals. In the embodiment, a user requests the provision of intervals, such as interval selection 423 (FIG. 4) or interval selection 134 (FIG. 1), with a user interface device in a user interface.

Generate operation 506 generates two or more intervals. The generation of intervals is described in conjunction with FIGS. 6 and 7. In an embodiment, an interval generation component 412 generates intervals 414 (FIG. 4) for display. Provide operation 508 provides the generated intervals. In one embodiment, a user interface component 406 displays the intervals 415 (FIG. 4). In other embodiments, the intervals are a menu, such as interval menu 116 (FIG. 1), that allows a user to select an interval for a function, such as filtering, which is described in conjunction with FIG. 8. In other embodiments, the intervals are provided as part of a display of statistical information or other types of information.

Figure 6:
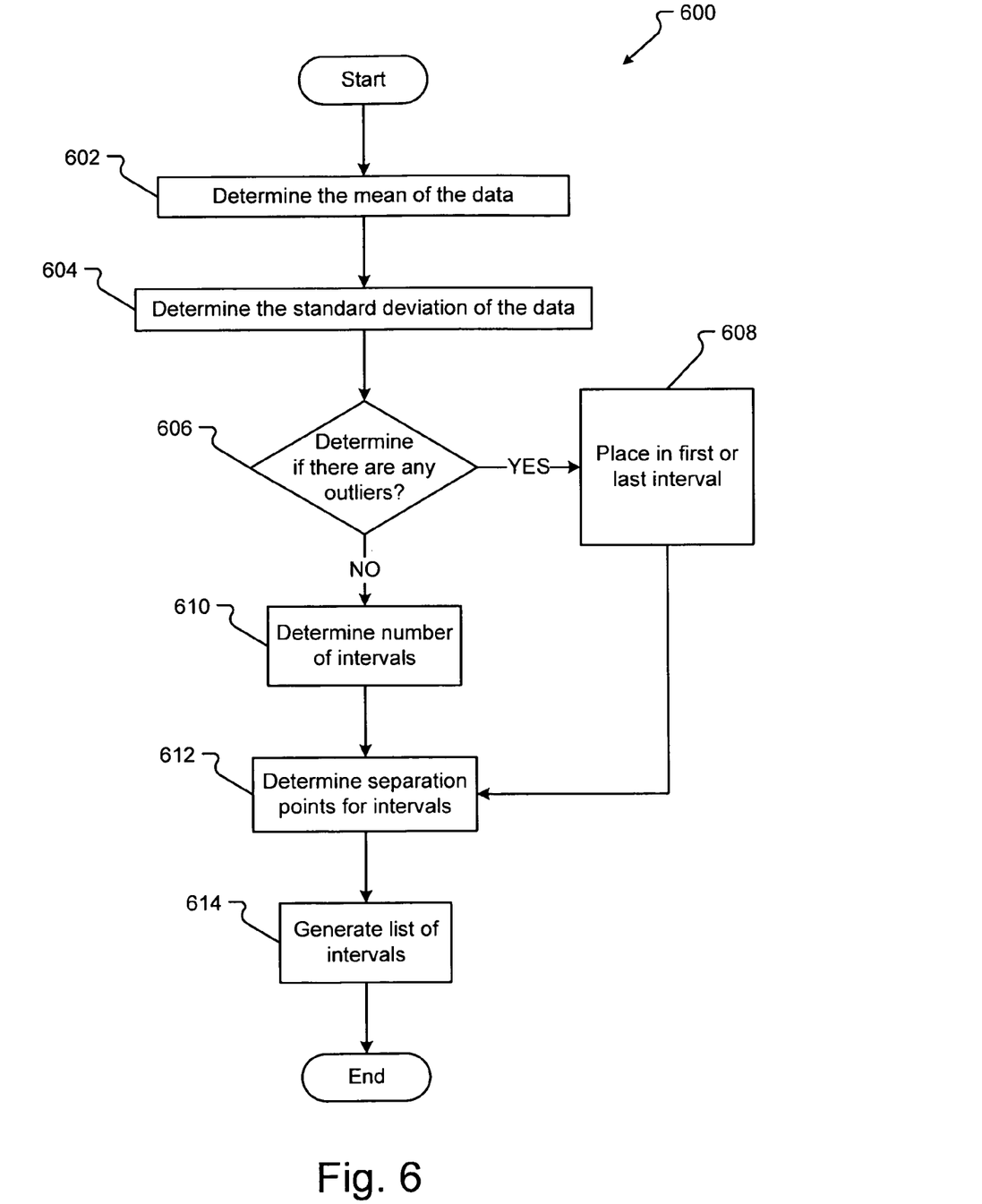
FIG. 6 is a flow diagram representing a further embodiment of a method for generating intervals for presentation to a user.

A method 600 for generating intervals is shown in FIG. 6. In the embodiment, method 600 is executed in a computer system, such as computer system 300 (FIG. 3), as a computer readable medium, such as computer readable medium 318 (FIG. 3), which includes computer implemented steps or instructions. Throughout the description of FIG. 6, references to example statistics will be made. The example values include a mean of 67.1 and a standard deviation of 19.9.

Determine operation 602 determines a mean, or average, for a portion of data. The portion of data may be a complete set of data or a selected portion of data that is a subset of the complete set of data. In one embodiment, an interval generation component, such as interval generation component 412 (FIG. 4), mathematically determines a mean for the data set. Determine operation 604 determines a standard deviation for the data set. The interval generation component 412 (FIG. 4), in one embodiment, mathematically determines the standard deviation of the data set.

Determine operation 606 determines if there are any "outliers" in the data set. In one embodiment, the interval generation component 412 (FIG. 4) determines the outliers by examining the data set for any number more than three standard deviations from the mean. For example, the number of sales, "2", for "Jimmy Doolittle" in the data set 130 (FIG. 1), is an outlier because it is more than 3 standard deviations from the mean. Mathematically, the number 2 is more than three standard deviations of 19.9, i.e., 3*19.9=59.7, from a mean of 67.1, i.e., 67.1−59.7=7.4, that is 2 is less than 7.4. In other embodiments, the outliers are considered any data value outside a predetermined number of standard deviations from the mean, for example, two standard deviations or five standard deviations above or below the mean. Still other embodiments define outliers as the first and last 10%, or other percentage, of data values in the data range. Other embodiments, as are known in the art, for determining outliers are contemplated and included in the attached claims.

If there is any data value that is an outlier, the process flows "YES" to place operation 608. Place operation 608 places any outliers in a first interval or a last interval. In an embodiment, the interval generation component 412 (FIG. 4) places the outliers in a first interval or a last interval. For example, the outlier data value 130 (FIG. 1) is placed in a first interval selection 132 (FIG. 1) labeled "Below 50." If there are no outlier data values, the process flows "NO" to determine operation 610.

Determine operation 610 determines the number of intervals. In the embodiment, an interval generation component 412 (FIG. 4) determines the number of intervals. The number of intervals depends on the number of and range of data values in the selected data set. For example, if there are only ten data values in the data set, only two intervals is appropriate. In contrast, if there are 10000 data values in the data set, then 20 intervals may be appropriate. In some embodiments, the number of intervals is also dependent on the number of intervals that are easily viewed and understood by a user. For example, it may be easiest for a user to understand and interpret five to eight intervals. In some embodiments, the interval generation component 412 (FIG. 4) determines a first number of intervals, such as eight easily interpreted intervals, and further generates sub-intervals to compensate for large numbers of data values in each of the first set of intervals. For example, there are too many data values in a first set of intervals 132 (FIG. 1) and thus, a set of subintervals 116 (FIG. 1) is generated to more easily interpret the data 118 (FIG. 1).

Determine operation 612 determines the separation points for the intervals. In one embodiment, the interval generation component 412 (FIG. 4) determines the range for all numeric data values between the lowest number in the data set and the highest number in the data set. The outliers are excluded in some embodiments. The range is then divided by the number of intervals determined by determine operation 610. By adding the result to the lowest number, the first interval separation point is determined. Likewise, the result is added to the first separation point to find the next separation point. The recursive addition continues until every interval has a set of separation points. In other embodiments, the separation point for the first interval is arbitrarily chosen before the result is recursively added to the starting point. In still another embodiment, the starting point for the interval separation points is the number that is three standard deviations from the mean.

In yet other embodiments, the separation points are determined such that an equal number of points are distributed amongst the several intervals. Thus, for a normal distribution, the interval starting points are statistically chosen to incorporate the same number of data values. Thus, the interval separation points will be more closely related near the mean than for intervals further from the mean because, statistically, most data values are near the mean in a normal distribution.

Once the interval separation points are determined, generate operation 614 generates the list of intervals. In embodiments, the list of intervals are displayed by a user interface, such as user interface 402 (FIG. 4), in a display generated by a UI component, such as UI component 406 (FIG. 4). For example, the list of intervals is provided in a menu, such as menu 114 (FIG. 1).

Figure 7:
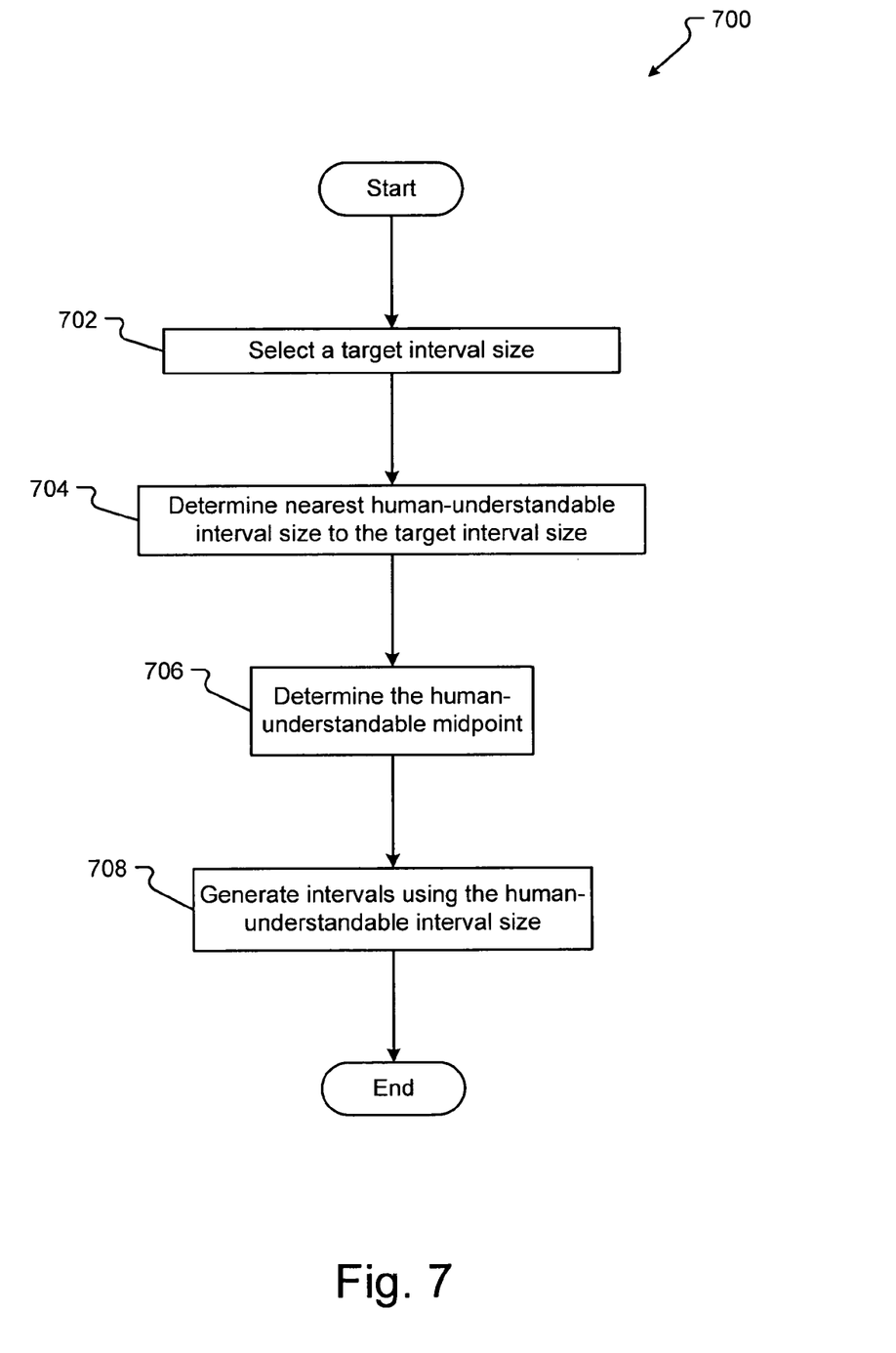
FIG. 7 is a flow diagram representing an embodiment of a method for generating human-understandable intervals.

A method 700 for determining intervals is shown in FIG. 7. In an embodiment, method 700 is executed in a computer system, such as computer system 300 (FIG. 3), as a computer readable medium, such as computer readable medium 318 (FIG. 3), which includes computer implemented steps or instructions. Select operation 702 selects a target interval size. In one embodiment, the interval generation component 412 (FIG. 4) selects the target interval size. For a population having a normal distribution, 95% of the population is within 2 standard deviations of the mean. In an embodiment, a target interval size is an interval every one half of a standard deviation. Ten intervals are created when using the one half the standard deviation separation point. For example, the following table shows the intervals for a separation point every one half of the standard deviation.

| Interval Number | Value ranges |
|---|---|
| 1 | All values less than (Mean − 2 * Standard Deviation) |
| 2 | All values equal to or greater than (Mean − 2 * Standard Deviation) but less than (Mean − 1.5 * Standard Deviation) |
| 3 | All values equal to or greater than (Mean − 1.5 * Standard Deviation) but less than (Mean − 1 * Standard Deviation) |
| 4 | All values equal to or greater than (Mean − 1 * Standard Deviation) but less than (Mean − 0.5 * Standard Deviation) |
| 5 | All values equal to or greater than (Mean − 0.5 * Standard Deviation) but less than the Mean |
| 6 | All values equal to or greater than Mean but less than (Mean + 0.5 * Standard Deviation) |
| 7 | All values equal to or greater than (Mean + 0.5 * Standard Deviation) but less than (Mean + 1 * Standard Deviation) |
| 8 | All values equal to or greater than (Mean + 1 * Standard Deviation) but less than (Mean + 1.5 * Standard Deviation) |
| 9 | All values equal to or greater than (Mean + 1.5 * Standard Deviation) but less than (Mean + 2 * Standard Deviation) |
| 10 | All values equal to or greater than (Mean + 2 * Standard Deviation) |

The fraction of the standard deviation used to determine the separation for the intervals may be greater or less than half of the standard deviation. However, using half the standard deviation produces ten evenly divided intervals. Ten intervals have been found to be more easily understood by users. In some embodiments, a user selects the fraction of the standard deviations that could be used to create the intervals and, thus, controls the number of intervals created.

Unfortunately, separating the intervals by the mean and the standard deviations can create interval separations that are difficult to understand. For example, a large data set may have a mean of 5.4968. The standard deviation may be 1.322. The following table provides exemplary separations using the above fraction of the standard deviation, i.e., 0.5:

| Interval | Top of Interval | Bottom of Interval |
|---|---|---|
| 1 | 2.8528 | |
| 2 | 2.8528 | 3.5138 |
| 3 | 3.5138 | 4.1748 |
| 4 | 4.1748 | 4.8358 |
| 5 | 4.8358 | 5.4968 |
| 6 | 5.4968 | 6.1578 |
| 7 | 6.1578 | 6.8188 |
| 8 | 6.8188 | 7.4798 |
| 9 | 7.4798 | 8.1408 |
| 10 | | 8.1408 |

Such values are hard to understand for a user.

Determine operation 704 determines the nearest human-understandable interval size similar to the target interval size. In one embodiment, the interval generation component 412 (FIG. 4) determines the nearest human-understandable interval size similar to the target interval size. In embodiments, users generally understand divisions of numbers at whole integer values, i.e. 1, 2, 3, etc.; 100, 200, 300, etc.; and so forth. In addition, users generally understand intervals based on a fraction of the power of ten. For example, intervals are separated by 0.01, 0.1, 1, 10, 100, 1000, etc. In other embodiments, the intervals are separated by the power of ten divided by 2, such as 0.05, 0.5, 5, 50, 500, etc., by the power of ten divided by 4, such as 0.025, 0.25, 2.5, 25, 250, etc., or by the power of ten divided by 5, such as 0.02, 0.2, 2, 20, 200 etc. In other embodiments, a different factor, such as the power of eight or the power of two, is used in determining the human-understandable interval size. Further, in other embodiments, other fractions of the power are used to determine the interval size, e.g., the power of eight divided by 16.

The target interval size is compared to one or more human-understandable interval sizes to determine which human-understandable interval size is the nearest to the target interval size. For example, if the target interval size (0.5*Standard Deviation) is 49.6278, the nearest human-understandable interval size is a power of ten, e.g. 100, divided by a factor of 2. Thus, 50 will be used to create the interval separation points.

Determine operation 706 determines the human-understandable midpoint of the selected data. In one embodiment, the interval generation component 412 (FIG. 4) determines the human-understandable midpoint of the selected data. The mean of the population can be a value that is less understandable, such as the mean 5.4968 mentioned above. In embodiments, the mean is rounded to the nearest multiple of the human-understandable interval size. For example, if the mean is 5.4968 and the human-understandable interval size is 0.1, the human-understandable midpoint would be 5.5. Likewise, if the is 5.4968 and the human-understandable interval size is 2, the human-understandable midpoint would be 6. Thus, the human-understandable is more "understandable" because the intervals occur on more easily understood separation points.

For example, if the human-understandable interval size is 2 and the determined midpoint is 6 (determined from a mean of 5.4968), the intervals would be at 0, 2, 4, 6, 8, 10, etc. Similarly, if the human-understandable interval size is 0.1 and the determined midpoint is 5.5, the intervals would be at 5.3, 5.4, 5.5, 5.6, 5.7, etc. If the human-understandable interval is 50 and the determined midpoint is 0 (determined from a mean of 5.4968), the intervals would be at −100, −50, 0, 50, 100, etc.

In an alternative embodiment, the human-understandable midpoint is the nearest human-understandable interval separation point. For example, if the mean is 5.4968 and the human-understandable interval is 0.1, the human-understandable midpoint would be 5.5. Likewise, if the mean is 5.4968 and the human-understandable interval is 50, the human-understandable midpoint would be 0. Thus, the human-understandable midpoint is more "understandable" than the midpoint generated from rounding the mean to the nearest whole integer because the intervals fall on more intuitive separation points. For example, if the human-understandable interval is 50 and the determined midpoint is 0 from a mean of 5.4968, the intervals may be at −100, −50, 0, 50, 100, etc. Similarly, if the human-understandable interval is 0.1 and the determined midpoint is 5 from a mean of 5.4968, the intervals may be at 5.3, 5.4, 5.5, 5.6, 5.7, etc.

Generate operation 708 generates intervals using the human-understandable midpoint and the human-understandable interval size. In one embodiment, the interval generation component 412 (FIG. 4) generates intervals using the human-understandable midpoint and the human-understandable interval size. In an embodiment, the intervals are generated by multiplying the interval size by a positive or negative integer, e.g., −2, −1, 0, 1, 2, etc., and adding the result to the human-understandable midpoint. Once the result is greater or lesser than the value for two standard deviations above or below the mean, no other intervals are needed. The intervals generated provide easily understood intervals with breaks at whole integer values. The following table provides an example of how ten intervals would be generated with the human-understandable interval sizes (assuming that the interval separation point that is 4 human-understandable interval sizes from the human-understandable midpoint is greater, for the top interval, and lesser, for the bottom interval, than two standard deviations from the mean):

| Interval Number | Value ranges |
| --- | --- |
| 1 | All values less than (Human-Understandable Midpoint − 4 * Human-Understandable Interval Size) |
| 2 | All values equal to or greater than (Human-Understandable Midpoint − 4 * Human-Understandable Interval Size) but less than (Human-Understandable Midpoint − 3 * Human-Understandable Interval Size) |
| 3 | All values equal to or greater than (Human-Understandable Midpoint − 3 * Human-Understandable Interval Size) but less than (Human-Understandable Midpoint − 2 * Human-Understandable Interval Size) |
| 4 | All values equal to or greater than (Human-Understandable Midpoint − 2 * Human-Understandable Interval Size) but less than (Human-Understandable Midpoint − 1 * Human-Understandable Interval Size) |
| 5 | All values equal to or greater than (Human-Understandable Midpoint − 1 * Human-Understandable Interval Size) but less than the Human-Understandable Midpoint |
| 6 | All values equal to or greater than Human-Understandable Midpoint but less than (Human-Understandable Midpoint + 1 * Human-Understandable Interval Size) |
| 7 | All values equal to or greater than (Human-Understandable Midpoint + 1 * Human-Understandable Interval Size) but less than (Human-Understandable Midpoint + 2 * Human-Understandable Interval Size) |
| 8 | All values equal to or greater than (Human-Understandable Midpoint + 2 * Human-Understandable Interval Size) but less than (Human-Understandable Midpoint + 3 * Human-Understandable Interval Size) |

-continued

| Interval Number | Value ranges |
|---|---|
| 9 | All values equal to or greater than (Human-Understandable Midpoint + 3 * Human-Understandable Interval Size) but less than (Human-Understandable Midpoint + 4 * Human-Understandable Interval Size) |
| 10 | All values equal to or greater than (Human-Understandable Midpoint + 4 * Human-Understandable Interval Size) |

Figure 8:
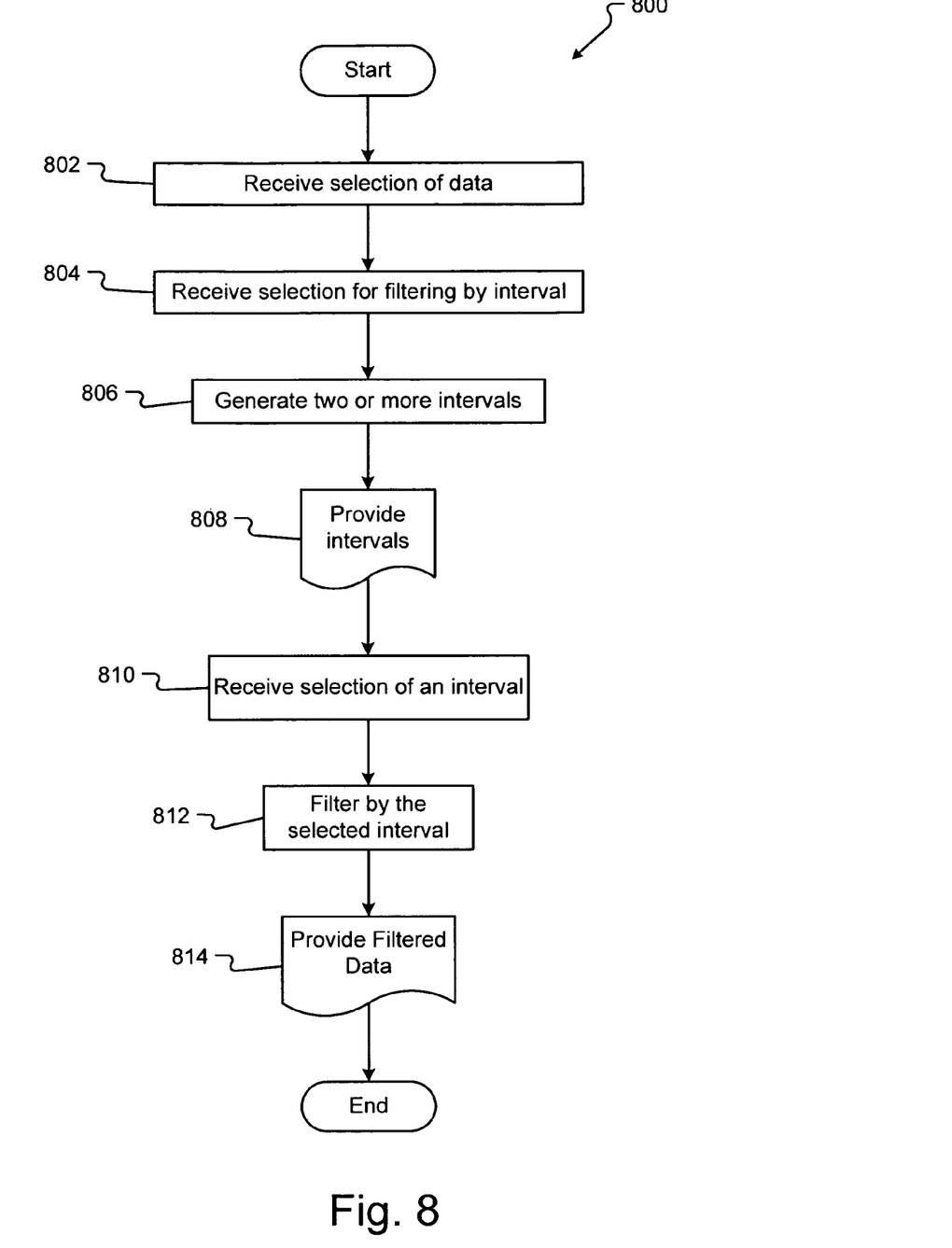
FIG. 8 is a flow diagram representing an embodiment of a method for filtering a selection of data by a selected interval.

A method 800 for generating intervals for a filter is shown in FIG. 8. In the embodiment, method 800 is executed in a computer system, such as computer system 300 (FIG. 3), as a computer readable medium, such as computer readable medium 318 (FIG. 3), which includes computer implemented steps or instructions. Receive operation 802 receives a selection of data, such as data selection 405 (FIG. 4). In one embodiment, a user selects a portion of data, such a data selection 118 (FIG. 1), with a user interface device, such as user interface device 314 (FIG. 3), in a user interface, such as user interface 402 (FIG. 4). Receive operation 802 receives a selection for filtering by an interval, such as filter selection 404 (FIG. 4). In embodiments, a user selects a filter selection, such a filter selection 110 (FIG. 1), with a user interface device, such as user interface device 314 (FIG. 3), in a user interface, such as user interface 402 (FIG. 4).

Generate operation 804 generates two or more intervals. The generation of intervals is described in conjunction with FIGS. 6 and 7. In an embodiment, an interval generation component 412 generates intervals 414 (FIG. 4) for display. Display operation 806 displays the intervals on a user interface device. Receive operation 808 receives a selection of an interval, such as interval filter selection 134, from the user interface. Provide operation 808 provides the generated intervals. In the embodiment, the intervals are a menu, such as interval menu 116 (FIG. 1), which allows a user to select an interval for a function, such as filtering. The intervals displayed in the menu are associated with the selection of data. In other words, the intervals are generated to separate the selected data into subsets of data that are arranged into the intervals.

Receive operation 810 receives a selection of one of the intervals. In an embodiment, a user makes a selection of interval from the interval menu with a user interface device. The interval selection, such as interval selection 423 (FIG. 4), is received, in embodiments, by the interval generation component 412 (FIG. 4).

Filter operation 812 filters the selected data by the selected interval. In one embodiment, a filter, such as filter 418 (FIG. 4), accesses a portion of data in a data set, such as data set 420, and applies a filter operation to the portion of data. Provide operation 814 provides the filtered data. For example, the filter sends the filtered data to a UI component for display on the user interface. An embodiment of a set of filtered data appears as filtered data 202 (FIG. 2).

As one skilled in the art will recognize, embodiments of the present invention provide numerous advantages. Numeric data within a data program can be organized into two or more intervals. The intervals group the numeric data into easily understood separation points that, in embodiments, are whole integer values that have an easily recognized pattern. The number of intervals is also an easily understood amount, such as ten or five. In further embodiments, the intervals are used for other functions, such as filtering, to increase a user's options in organizing or manipulating the numeric data.

Figure 9A:
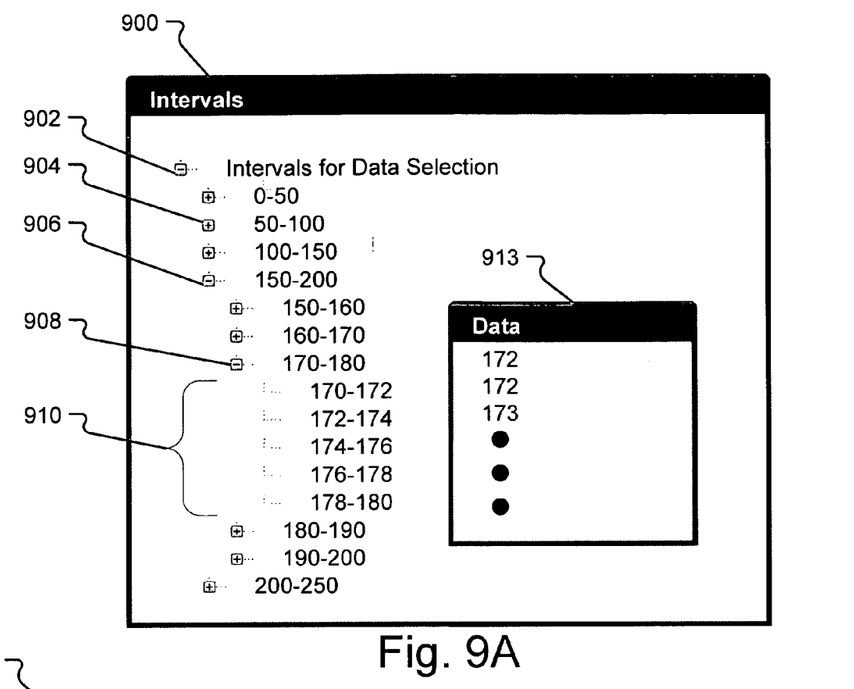
FIG. 9A and FIG. 9B are embodiments of user interface displays providing other embodiments of interval displays.
Figure 9B:
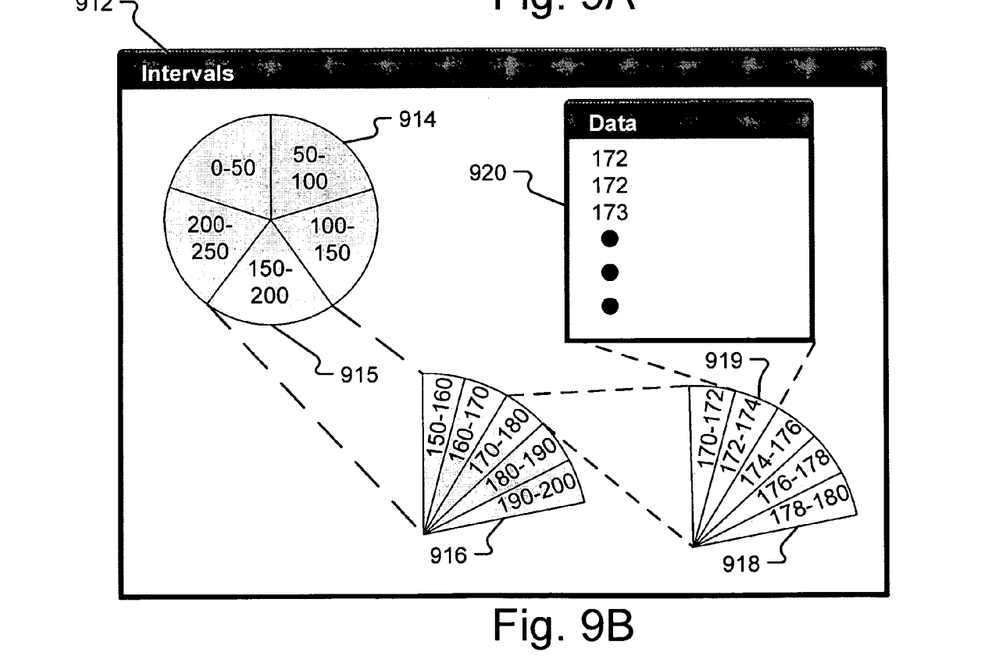

Alternative embodiments of interval displays 900 and 912 are shown in FIGS. 9A and 9B. In one embodiment, an interval display window 900 includes an interval tree 902 that has two or more nodes or braches, for example, node 904. The nodes, in embodiments, are expandable to reveal further subnodes, such as expanded node 906, which can have further expanded nodes 908. At a lowest level of the tree, a list of data sorted into intervals 910 allows the user to select on an interval to display the data 913. The tree 902 may be formatted in other ways, but, however embodied, the tree 902 provides a logical and intuitive display of the intervals.

Another embodiment of an interval display 912 provides intervals in a graphical element, for example, pie chart 914. In one embodiment, sub-intervals 916 are displayed if a slice of the pie 915 is selected. Further sub-intervals 918 are possible. If a final slice 919 is selected, the data 920 is displayed. In other embodiments, the graphical element is another type of chart, for example, a bar chart.

Although the embodiments have been described in language specific to structural features, methodological acts, and computer-readable media containing such acts, it is to be understood that the possible embodiments, as defined in the appended claims, are not necessarily limited to the specific structure, acts, or media described. One skilled in the art will recognize other embodiments or improvements that are within the scope and spirit of the present invention. Therefore, the specific structure, acts, or media are disclosed only as illustrative embodiments. The invention is defined by the appended claims.

What is claimed is:

1. A computer storage medium, executable on a computing system and encoding a computer program of instructions for executing a computer implemented method for providing intervals, the method comprising:

receiving a selection of data;

receiving a request to provide intervals, wherein each interval represents a numeric range of a portion of the selected data;

generating a first set of intervals comprising two or more intervals, the two or more intervals associated with the data;

providing the two or more intervals of the first set of intervals;

receiving an indication that the data in the selection of data has changed;

receiving a next request to provide intervals;

generating a second set of intervals comprising two or more intervals associated with the changed data, wherein at least one interval in the second set of intervals is different from the intervals in the first set of intervals; and providing the two or more intervals of the second set of intervals.

2. The computer storage medium defined in claim 1, wherein generating the two or more intervals comprises:

determining a mean of the data; and determining a standard deviation of the data.

3. The computer storage medium defined in claim 2, further comprising;
 determining if there are one or more outliers in the data.

4. The computer storage medium defined in claim 3, wherein determining if there are one or more outliers comprises determining if one or more data values is more than a predetermined number of standard deviations from the mean.

5. The computer storage medium defined in claim 1, wherein generating the two or more intervals comprises:
 determining a number of interval divisions for the data.

6. The computer storage medium defined in claim 5, wherein determining a number of interval divisions comprises determining human-understandable intervals.

7. The computer storage medium defined in claim 6, wherein determining human-understandable intervals comprises:
 determining a target interval size based on a factor of a standard deviation;
 generating two or more human-understandable interval sizes;
 comparing the target interval size to the two or more human-understandable interval sizes; and
 selecting the human-understandable interval size that is nearest the target interval size.

8. The computer storage medium defined in claim 7, wherein determining human-understandable intervals further comprises:
 determining a human-understandable midpoint; and
 generating human-understandable intervals by adding multiples of the human understandable
 interval size to the midpoint.

9. The computer storage medium defined in claim 8, wherein determining the human-understandable midpoint comprises determining the nearest human-understandable interval separation point.

10. The computer storage medium defined in claim 1, further comprising generating one or more subintervals.

11. A computer system having a graphical user interface including a display and a user interface selection device, the computer system further comprising:
 a memory;
 a processor coupled to the memory, the processor configured to perform a method of providing and selecting from a filter menu on the display, the method comprising:
  receiving a selection of data;
  receiving a selection for filtering by an interval, wherein each interval represents a numeric range of a portion of the selected data;
  generating a first set of intervals comprising two or more intervals;
  providing the two or more intervals of the first set of intervals in a filter selection menu, the two or more intervals associated with the selection of data;
  receiving an indication that the data in the selection of data has changed;
  generating a second set of intervals comprising two or more intervals associated with the changed selection of data, wherein at least one interval in the second set of intervals is different from the intervals in the first set of intervals;
  providing the two or more intervals of the second set of intervals in the filter selection menu;
  receiving a selection of one of the intervals;
  filtering by the selected interval; and
  providing the filtered data.

12. The computer system as defined in claim 11, wherein receiving a selection of interval to filter the selection of data; and in response to the selection of an interval, displaying the filtered data associated with the selected interval.

13. A computer storage medium, executable on a computing system and encoding computer program components for generating intervals, the components comprising:
 a user interface component that generates a data display, receives a selection of data, and receives a selection to generate two or more intervals, wherein each interval represents a numeric range of a portion of the selected data; and
 an interval generation component coupled to the user interface component, the interval generation component operable to determine intervals for the selection of data and generate the intervals for display by the user interface component, wherein the interval generation component generates a first set of intervals based on the selection of data, and wherein the interval generation component generates a second set of intervals after receiving an indication that the data in the selection of data has changed, and wherein the second set of intervals is based on the changed selection of data and comprises at least one interval that is different from the intervals of the first set of intervals.

14. The computer storage medium as defined in claim 13, further comprising:
 a filter coupled to the user interface component, the filter operable to filter the selection of data according to the selection of interval.

15. The computer storage medium defined in claim 13, wherein the interval generation component is operable to determine a number of interval divisions for the data.

16. The computer readable storage medium defined in claim 15, wherein the interval generation component is operable to determine human-understandable intervals.

17. The computer storage medium defined in claim 16, wherein the human-understandable interval has separation points on whole integers and is a factor of the power of ten.

18. The computer storage medium defined in claim 16, wherein the interval generation component is operable to determine a target interval size based on a factor of a standard deviation, generate two or more human-understandable interval sizes, compare the target interval size to the two or more human-understandable interval sizes, select the human understandable interval size that is nearest the target interval size, determine a human-understandable midpoint, and generate human-understandable intervals by adding multiples of the human-understandable interval size to the midpoint.

19. The computer storage medium defined in claim 18, wherein a user selects the factor of a standard deviation used to generate the two or more human-understandable interval size, and the selected factor of a standard deviation controls the number of intervals generated.

20. The computer storage medium defined in claim 18, wherein in the human-understandable midpoint is the nearest, whole integer value to the mean.

* * * * *